Patented June 17, 1952

2,600,515

UNITED STATES PATENT OFFICE 2,600,515

PROCESS FOR THE UTILIZATION OF BLAST FURNACE SLAG IN ROTARY CEMENT FURNACES

Heinrich Wilhelm Mooser, Maastricht, Netherlands

No Drawing. Application January 19, 1948, Serial No. 3,173. In Belgium October 24, 1945

Section 1, Public Law 690, August 8, 1946
Patent expires October 24, 1965

5 Claims. (Cl. 106—100)

This invention relates to an improved method of operating a rotary cement kiln.

The use of blast furnace slag, in a finely powdered mixture with limestone, in order to feed rotary cement kilns by the normal methods is known. Nevertheless blast furnace slag obtained by the basic process can only be introduced in limited proportions owing to its great fusibility which produces in the baking zone petrified rings which choke up the kiln and make its operation irregular with poor output.

With regard to the acid melting process, which is applied more and more as a manganese-free process, to blast furnaces, the slags which it produces contain no manganese, which makes them particularly suitable for the manufacture of cement, in which manganese is an undesirable substance. These slags however are much more fusible than those yielded by the basic process and for this reason they cannot be fed by the usual means into a rotary cement kiln except in very limited proportions.

An object of the present invention is to utilize such basic or acid blast furnace slags as a raw material in cement kilns.

The present invention provides a method of operating a rotary cement kiln in which previously dried and finely pulverized blast furnace slag is introduced directly into the flame of the kiln. Considerable quantities of slag can be introduced in this way without experiencing the above-described difficulties.

The slag powder may be blown in at the same time and by the same channels as the fuel, namely pulverized coal, heavy oil or gas, but it can also be effected separately from the fuel through special suitable channels.

Experience has shown that very large quantities of slag can be thus introduced, so that the capacity of production of the kiln is thus considerably increased without impairing its conditions of operation or the quality of the clinker obtained.

On the contrary the quality of the latter is if anything improved, probably due to the fact that, because of the very high temperature which prevails in the flame, the incorporation of the slag in the material which is making its normal passage through the kiln takes place chiefly by diffusion.

The slags whether acid or basic, introduced into the flame according to the invention must be considered as acid components among the components of the cement. In order to compensate for the excess of acidity which they would introduce into the composition of the latter it is necessary to correct accordingly the proportions of the raw materials which continue to be fed into the kiln in the normal way. This mixture is therefore made richer in lime and it accordingly exhibits greater affinity for the acid slag added.

The mixture fed into the kiln by the usual channel being richer in lime and more fireproof, the process according to the invention thus eliminates any possibility of formation of rings in the clinkering zone of the kiln.

Likewise by the introduction of slags according to the invention the undesired formation of rings of paste which so often hindered the operation of rotary cement kilns acting on the wet method is completely avoided.

The present method of operation appreciably improves the heat system of the kiln, which becomes more economical. The slag is added in the dry state whereas in the normal method of introduction it would be necessary to moisten it more or less and the water thus used would afterwards have to be evaporated in the kiln.

Blast furnace slag being very fusible and still having its heat of formation available, its incorporation in the clinker mass is effected easily and rapidly by means of a very small supply of heat. The consumption of fuel per ton of clinker is reduced and the utilization of the heat produced in the kiln is better than with the known methods.

It is well known that certain blast furnace slags have an appreciable content of potash and other alkalis and that these elements exert an injurious action on the cement if these slags are introduced into the rotary kiln by the normal channels. Thus, in particular, cement ground from clinker obtained in this way often forms clumps and hardens in the bags, which is a very unpleasant occurrence, attributed to the rapid carbonating of aluminates of potash contained in the cement.

It has been observed on the other hand that if the slag containing potash or other alkalis is introduced according to the invention directly into the flame of the kiln these components are, under the action of the very high temperature, volatilized in part and escape with the exhaust gases of the kiln, while the remainder undergoes such transformations that its above mentioned impairing action for the cement is eliminated. It seems in particular that the potash and other alkalis are combined in the cement in the form of silicates which are appreciably less rapidly converted to carbonates than are aluminates.

The method according to the invention therefore permits of using as the raw material a far wider range of blast furnace slags than do the usual methods; their percentage may be appreciably greater, the operation of the kiln is more regular and economical, and the output is greatly increased.

I claim:

1. The method of manufacture of cement clinker in cement kilns which comprises drying and pulverizing blast furnace slag, directing a flame into the kiln, moving material containing lime through the kiln toward the flame therein, introducing the dried pulverized blast furnace slag directly into the flame of the kiln for melting the slag into drops and allowing the melted drops of slag to gravitate onto the material in the kiln travelling towards the flame for intimately incorporating the melted drops of slag into the material in the kiln.

2. The method of manufacture of cement clinker as set forth in claim 1 in which the content of lime in the material moved through the kiln is increased for compensating for excess acidity in the material caused by the addition of blast furnace slag introduced into the flame of the kiln.

3. The method of manufacture of cement clinker as set forth in claim 1 in which the pulverized blast furnace slag is mixed with fuel injected into the kiln for producing the flame in the kiln.

4. The method of manufacture of cement clinker as set forth in claim 1 which includes the further step of volatilizing the pulverized slag in part and discharging the exhaust gases of the kiln while the remainder undergoes such transformations that compensating action on the material in the kiln is effected.

5. Improvements in the manufacture of cement clinker which comprises moving material rich in lime through a kiln, drying and pulverizing blast furnace slag, establishing a kiln flame adjacent the material moving through the kiln, directing the flame upon the kiln material as it moves adjacent the flame, directly introducing the pulverized particles of slag into the kiln flame for volatilizing gases from the slag while the particles of slag are reduced to the molten state and fall as drops through the flame onto the kiln material which is rich in lime and has an affinity for the slag and combining the molten drops of slag with the material in the kiln as it moves through the kiln.

HEINRICH WILHELM MOOSER.

REFERENCES CITED

The following references are of record in the file of this patent:

UNITED STATES PATENTS

| Number | Name | Date |
|---|---|---|
| 1,320,172 | Pontoppidan | Oct. 28, 1919 |
| 2,270,870 | Ditto | Jan. 27, 1942 |